United States Patent
Hara et al.

(10) Patent No.: US 12,358,690 B2
(45) Date of Patent: Jul. 15, 2025

(54) STORAGE CONTAINER FOR SOFT CAPSULES, SOFT CAPSULE-CONTAINING STORAGE CONTAINER, AND LAMINATE FOR SOFT CAPSULES

(71) Applicant: HOSOKAWA YOKO CO., LTD., Tokyo (JP)

(72) Inventors: Tsutomu Hara, Tokyo (JP); Takamasa Mori, Tokyo (JP); Shota Sato, Tokyo (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 80 days.

(21) Appl. No.: 18/034,104

(22) PCT Filed: Oct. 14, 2021

(86) PCT No.: PCT/JP2021/038021
§ 371 (c)(1),
(2) Date: Apr. 27, 2023

(87) PCT Pub. No.: WO2022/091797
PCT Pub. Date: May 5, 2022

(65) Prior Publication Data
US 2023/0382599 A1    Nov. 30, 2023

(30) Foreign Application Priority Data
Oct. 30, 2020   (JP) ................................ 2020-183120

(51) Int. Cl.
*B65D 33/00*     (2006.01)
*A61J 1/03*     (2023.01)
(Continued)

(52) U.S. Cl.
CPC .............. *B65D 33/007* (2013.01); *A61J 1/03* (2013.01); *B65D 33/2508* (2013.01); *B65D 65/40* (2013.01)

(58) Field of Classification Search
CPC ......... A61J 1/03; B65D 33/00; B65D 33/007; B65D 33/25; B65D 33/2508; B65D 65/40
(Continued)

(56) References Cited

U.S. PATENT DOCUMENTS

| 5,804,265 A | 9/1998 | Saad et al. |
| 7,025,207 B2 * | 4/2006 | Breu ................ B65D 83/0445 |
| | | 206/532 |

(Continued)

FOREIGN PATENT DOCUMENTS

| JP | 08-169817 A | 7/1996 |
| JP | 2004-351007 A | 12/2004 |
| JP | 3191805 U | 7/2014 |

OTHER PUBLICATIONS

Extended European Search Report issued Mar. 28, 2024 in Application No. 21885916.3.

*Primary Examiner* — Bryon P Gehman
(74) *Attorney, Agent, or Firm* — Sughrue Mion, PLLC

(57) ABSTRACT

A storage container for storing soft capsules to be orally ingested includes: a storage space for storing the soft capsules; an inner surface facing the storage space and contacting the soft capsules inside the storage space; and a separation unit causing part of a contact region of the soft capsules contacting the inner surface to be separated from the inner surface. The area of the contact portion of the contact region that contacts the inner surface is smaller than the area of the separation portion of the contact region that is separated from the inner surface.

16 Claims, 10 Drawing Sheets

(51) Int. Cl.
*B65D 33/25* (2006.01)
*B65D 65/40* (2006.01)

(58) Field of Classification Search
USPC .................................................. 206/532, 540
See application file for complete search history.

(56) References Cited

U.S. PATENT DOCUMENTS

| | | | | |
|---|---|---|---|---|
| 7,607,834 | B2* | 10/2009 | Alvater | B65D 81/3266 |
| | | | | 206/532 |
| 8,627,957 | B2* | 1/2014 | Ziemba | B65D 83/0463 |
| | | | | 206/532 |
| 2004/0171469 | A1 | 9/2004 | Brandolini et al. | |
| 2019/0315567 | A1 | 10/2019 | Cobler | |

* cited by examiner

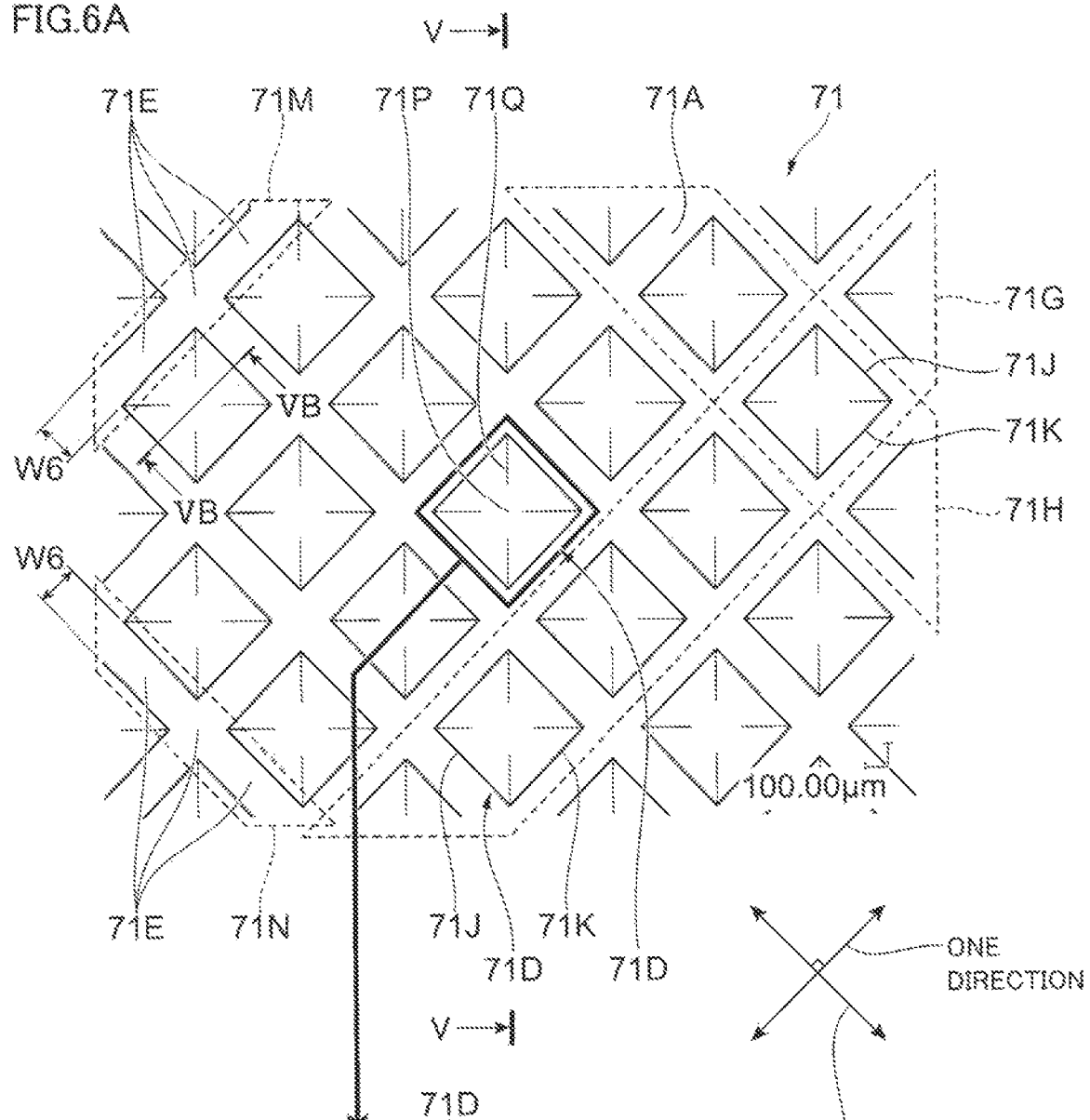
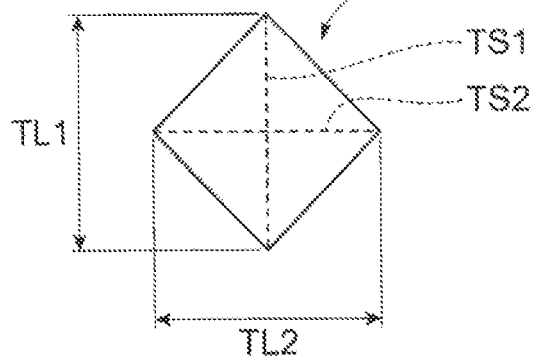
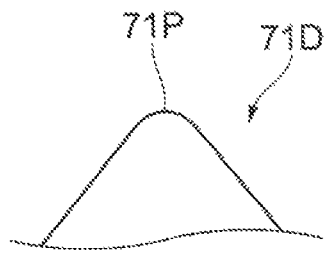
FIG.6A
FIG.6B

FIG.10

UNIT: DEGREE (°)

|  | 1 | 2 | 3 | AVERAGE |
|---|---|---|---|---|
| EXAMPLE | 15 | 15 | 18 | 16 |
| COMPARATIVE EXAMPLE | 50 | 45 | 40 | 45 |

STORAGE CONTAINER FOR SOFT CAPSULES, SOFT CAPSULE-CONTAINING STORAGE CONTAINER, AND LAMINATE FOR SOFT CAPSULES

CROSS REFERENCE TO RELATED APPLICATIONS

This application is a National Stage of International Application No. PCT/JP2021/038021 filed on Oct. 14, 2021, claiming priority based on Japanese Patent Application No. 2020-183120 filed on Oct. 30, 2020.

TECHNICAL FIELD

The present invention relates to a storage container for soft capsules, a soft capsule-containing storage container, and a laminate for soft capsules.

BACKGROUND ART

Conventionally, as a film base for capsules, a configuration mainly using gelatin, which is excellent in solubility and quick action, is known.

Patent Document 1 discloses a capsule made of a film base containing a straight-chain β-1,3-glucan, or a straight-chain β-1,3-glucan and gelatin.

The capsules are highly hygroscopic, and thereby easily adhere to each other during packaging, and easily adhere to containers during storage.

CITATION LIST

Patent Literature

Patent Document 1: Japanese Patent Application Laid-Open Publication No. 08-169817

SUMMARY OF INVENTION

Technical Problem

Soft capsules to be orally ingested are sometimes sold in storage containers such as bags.

Though depending on the materials composing the soft capsule, when moisture is absorbed, the soft capsules easily adhere to the inner surface of the storage container; therefore, it becomes difficult to take the soft capsules from the storage container.

An object of the present invention is to reduce adherence of soft capsules, which are to be orally ingested, to the inner surface of the storage container.

Solution to Problem

A storage container for soft capsules to be orally ingested, to which the present invention is applied, includes: a storage space storing the soft capsules; an inner surface facing the storage space and contacting the soft capsules inside the storage space; and a separation unit separating a part of a contact region of each of the soft capsules from the inner surface, the contact region contacting the inner surface.

Here, an area of a contact portion of the contact region contacting the inner surface may be smaller than an area of a separation portion of the contact region separated from the inner surface.

In addition, the inner surface may be provided with a convex part protruding toward the storage space and a concave part depressed toward an opposite side of the storage space, the separation unit may separate the part of the contact region from the inner surface using the convex part, and the plural convex parts may be provided to contact the contact region.

In addition, when the inner surface is viewed from a front side, the convex part may be formed in a rectangular shape.

In addition, one of diagonal lines of the convex part may be longer than the other.

In addition, on the inner surface, plural convex rows, each of which includes the plural convex parts arranged in one direction, may be arranged in an intersecting direction that intersects the one direction.

In addition, the convex parts may be arranged in the intersecting direction, and the plural convex rows along the intersecting direction may be arranged in the one direction, and, between the convex rows along the one direction, a groove along the one direction may be provided, and, between the convex rows along the intersecting direction, a groove along the intersecting direction may be provided.

In addition, another layer different from a layer having a portion serving as the inner surface may be provided on an opposite side of the storage space across the inner surface, and a void may be provided between the convex parts and the another layer.

Moreover, an aspect of the present invention may be considered as a soft capsule-containing storage container that has contained the soft capsules.

Moreover, in the case where the present invention is considered as a laminate for soft capsules used for the storage container for soft capsules to be orally ingested, the laminate includes: a contact surface contacting the soft capsules stored in the storage space; and a separation unit separating a part of a contact region of each of the soft capsules from the contact surface, the contact region contacting the contact surface.

Advantageous Effects of Invention

According to the present invention, it is possible to reduce adherence of soft capsules, which are to be orally ingested, to the inner surface of the storage container.

BRIEF DESCRIPTION OF DRAWINGS

FIGS. 6A and 6B are diagrams in the case where one surface of a thermal adhesion layer is viewed from a front side;

FIG. 10 is a table showing the experimental results.

DESCRIPTION OF EMBODIMENT

Hereinafter, an exemplary embodiment according to the present invention will be described in detail with reference to attached drawings.

Figure 1:
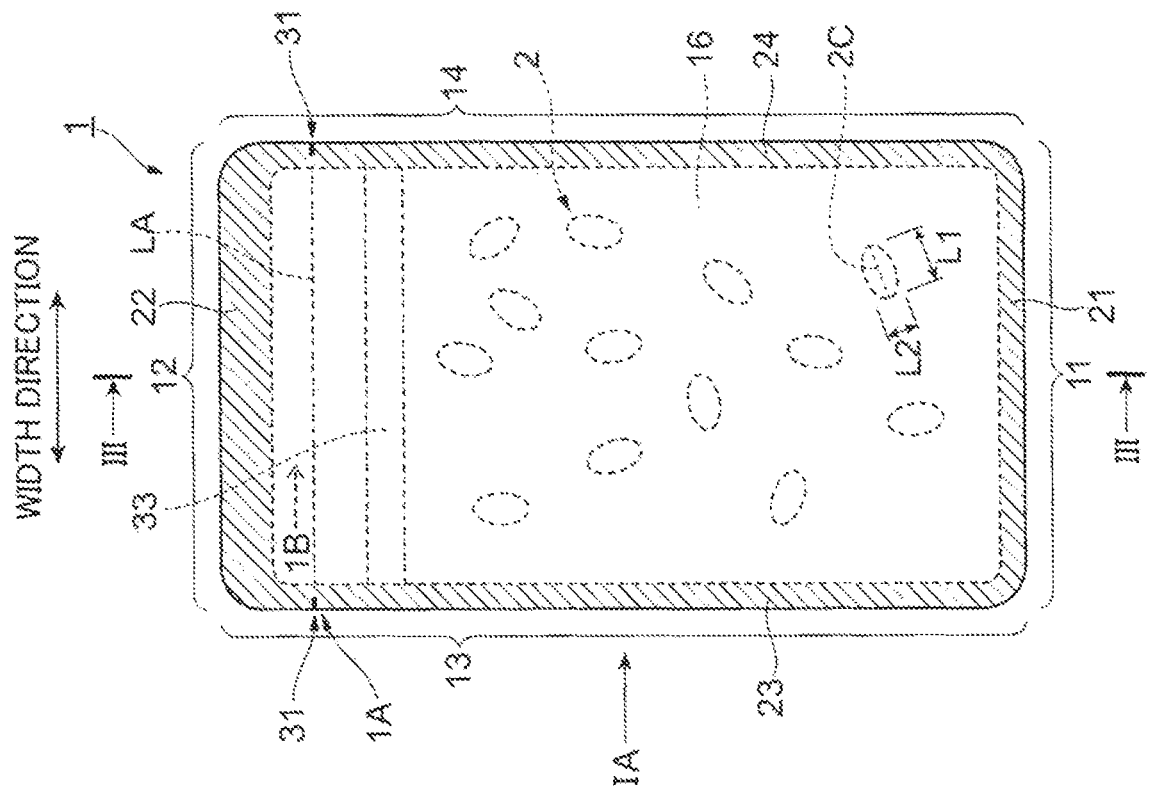
FIG. 1 is an elevational view showing a storage container related to the exemplary embodiment.

FIG. 1 is an elevational view showing a storage container 1 related to the exemplary embodiment.

The storage container 1 shown in FIG. 1 is a storage container 1 that contains soft capsules 2 to be ingested orally into the human body. Note that, in FIG. 1, to make it easier to see the figure, the soft capsules 2, which is smaller in number than the actual storage number of the soft capsules 2, are shown.

The "storage container 1" refers to a container with space to store the soft capsules 2, and the shape thereof does not matter in particular. The "storage container 1" includes containers configured with glass or plastic having rigidity, in addition to bag-shaped containers configured with a plastic film, etc., to be described later, having flexibility.

In the exemplary embodiment, the soft capsules 2 contained in the storage container 1 contain pharmaceuticals, foods for specified health uses, health foods, etc., inside thereof to be orally ingested by the user.

The soft capsule is configured by encapsulating liquid contents in a film (capsule skin) formed by gelatin, starch, carrageenan, etc.

As shown in FIG. 1, the outer shape of the soft capsule 2 is elliptic.

More specifically, the soft capsule 2 of the exemplary embodiment has a center axis 2C along the longitudinal direction of the soft capsule 2; when the soft capsule 2 is viewed from the direction orthogonal to the center axis 2C, the soft capsule 2 is elliptic.

In the soft capsule 2, the dimension L1 in the direction in which the center axis 2C extends is, for example, 10 mm to 20 mm. In addition, the dimension L2 in the short direction of soft capsule 2, which is orthogonal to the direction in which the center axis 2C extends, is, for example, 5 mm to 10 mm.

Note that the shape of the soft capsule 2 can be any shape as long as it is easy for the user to swallow. Specifically, the shape of the soft capsule 2 is not limited to an ellipse, but may be any of other shapes such as a sphere.

Moreover, the preferred range of dimensions (diameter) of the soft capsule 2 is as follows:

long diameter a (refer to FIG. 2): 4 mm to 20 mm, short diameter b: 4 mm to 10 mm, short diameter c: 4 mm to 10 mm Adoption of this dimension prevents the surface of the soft capsule 2 from contacting a concave part 71E (refer to FIG. 5), to thereby effectively prevent close adhesion between the soft capsule 2 and the one surface 71A.

In addition, for the focal point (the distance from the origin O) of the soft capsule (refer to FIG. 2), the preferred range is 2.0 mm to 12.0 mm. The more preferred range is 2.5 mm to 10.0 mm.

Since the shape of the soft capsule 2 can be spherical or elliptic, the ellipticity is "the range including 1".

Figure 2:
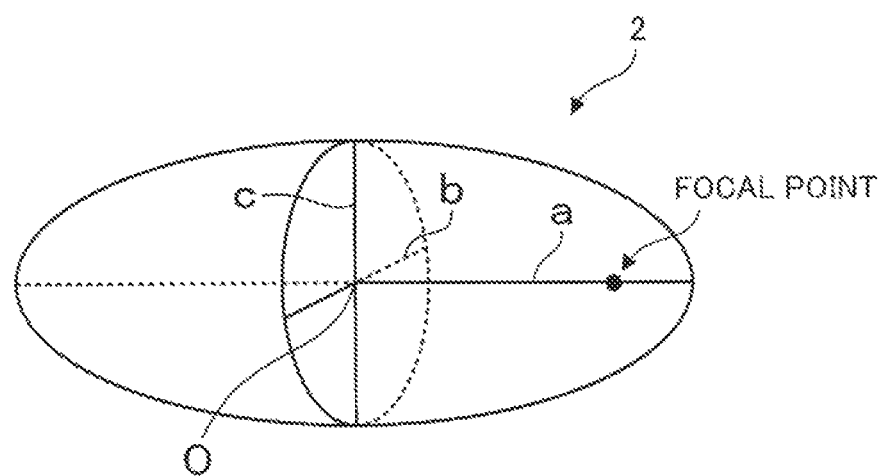
FIG. 2 is a diagram showing a soft capsule.

In the case of consideration based on FIG. 2, and assuming a≥b, the preferred range of ellipticity (b/a) of the plane forming the sides ab is 0.2 to 1. In addition, the more preferred range is 0.3 to 1.

Note that the same is true for the plane forming the sides ac and the plane forming the sides bc; the preferred range of ellipticity is 0.2 to 1, and the more preferred range is 0.3 to 1.

The storage container 1 of the exemplary embodiment is a rectangular bag as shown in FIG. 1, and includes a bottom part (filling opening part) 11, an upper edge part 12, a first side part 13, and a second side part 14.

The storage container 1 of the exemplary embodiment is formed by bonding a peripheral edge part of a first laminate and a peripheral edge part of a second laminate, which will be described later. Between the first laminate and the second laminate, a storage space 16 to contain the soft capsules 2 is formed.

The "storage space 16" refers to a space to contain the soft capsules 2 inside thereof, and the shape does not matter as long as the capacity thereof is larger than the volume of the soft capsules 2.

In addition, the bag in the exemplary embodiment is a so-called four-sided bag (flat pouch), in which the first laminate and the second laminate are bonded (thermally welded) at the four locations of the bottom part 11, the upper edge part 12, the first side part 13, and the second side part 14.

In the exemplary embodiment, there are provided a bottom seal part 21 extending along the bottom part 11, a first seal part 23 extending along the first side part 13, a second seal part 24 extending along the second side part 14, and a top seal part 22 extending along the upper edge part 12.

In the exemplary embodiment, the soft capsules 2 are charged from the filling opening part in the state in which the three locations of the upper edge part 12, the first side part 13, and the second side part 14 are bonded (the top seal part 22, the first seal part 23, and the second seal part 24 are formed).

Thereafter, at the filling opening part 11, the first laminate and the second laminate are bonded (welded). This forms the bottom seal part 21, to thereby complete the four-sided bag containing the soft capsules 2.

The form of the bag is not limited to the four-sided bag, but can also be a three-sided bag, a bottom gadget bag (standing pouch), etc.

As shown in FIG. 1, the storage container 1 is provided with a cut part 31 on the upper side of each of the first side part 13 and the second side part 14.

The cut part 31 is provided between the top seal part 22 and a zipper part 33.

When the storage container 1 is opened, for example, the cutting of the storage container 1 is carried out from one of the cut parts 31 indicated by the reference sign 1A as the start point toward the direction indicated by the arrow 1B in the figure. This forms an opening, to thereby make it possible to take the contents.

The shape of the cut part 31 does not matter and can be any shape, for example, a tortoiseshell shape, an I shape, a U shape or a V shape.

In addition, in the portion of the storage container 1 where the top seal part 22 is provided, a through hole for passing a hook for hanging may be formed. The shape of the through hole does not particularly matter, but, for example, the shape may be round or polygonal.

In addition, the position of forming the through hole is preferably the center part of the storage container 1 in the width direction; however, the position is not limited thereto, and the through hole may be disposed closer to the first side part 13 or the second side part 14.

Figure 3:
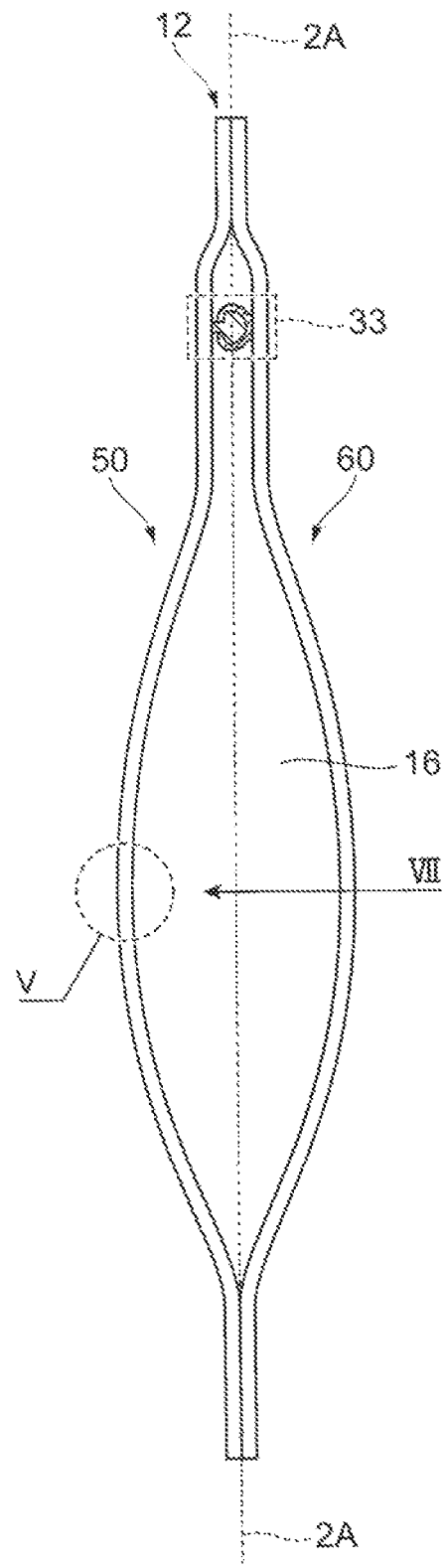
FIG. 3 is a cross-sectional view of the storage container along the III-III line in FIG. 1.

FIG. 3 is a cross-sectional view of the storage container 1 along the III-III line in FIG. 1. Note that, in FIG. 3, illustration of the soft capsules 2 is omitted.

Inside the storage container 1, the storage space 16 to contain the soft capsules 2 is provided.

In the exemplary embodiment, a first laminate 50 and a second laminate 60 are provided on both sides of the storage space 16.

In the exemplary embodiment, the first laminate 50 and the second laminate 60 are symmetrically structured with respect to the line indicated by the reference sign 2A as a center. Hereinafter, the description will be mainly given of the first laminate 50.

Furthermore, in the exemplary embodiment, the zipper part 33 is provided on the side of the storage container 1 where the upper edge part 12 is disposed.

The zipper part 33 fastens the first laminate 50 and the second laminate 60 that are separated from each other. In the exemplary embodiment, the zipper part 33 makes it possible to open and close the storage container 1.

Figure 4:
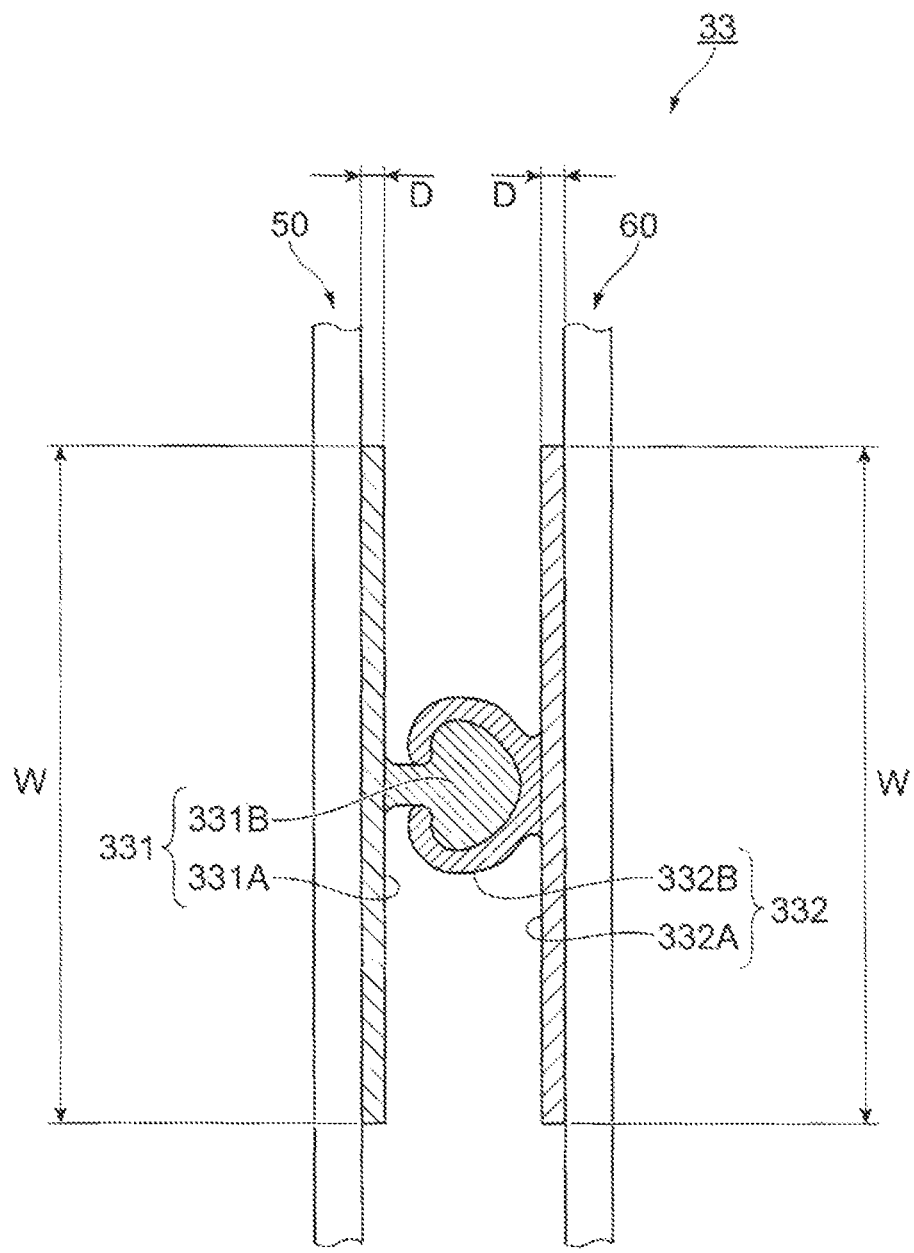
FIG. 4 is an enlarged view of a zipper part.

FIG. 4 is an enlarged view of the zipper part 33.

The zipper part 33 is configured with a male member 331 and a female member 332.

Note that, in the exemplary embodiment, the male member 331 is bonded to the first laminate 50 and the female member 332 is bonded to the second laminate 60; however, not limited thereto, the male member 331 may be bonded to the second laminate 60, and the female member 332 may be bonded to the first laminate 50.

The male member 331 includes a base part 331A formed into a strip shape and bonded to the first laminate 50, and a male fitting part 331B supported by the base part 331A.

The female member 332 includes a base part 332A formed into a strip shape and bonded to the second laminate 60, and a female fitting part 332B into which the fitting part 331B is fitted.

In the exemplary embodiment, the male fitting part 331B is fitted into the female fitting part 332B; thereby the first laminate 50 and the second laminate 60 are fastened to each other. This closes the opening.

In addition, removal of the male fitting part 331B from the female fitting part 332B releases fastening of the first laminate 50 and the second laminate 60, to thereby form the opening.

The width W of the base parts 331A and 332A provided in the male member 331 and the female member 332, respectively, is preferably from 3 mm to 20 mm. In addition, the thickness D of the base parts 331A and 332A is preferably from 100 μm to 400 μm.

Moreover, it is preferable that each of the male member 331 and the female member 332 is composed of the same material as the material constituting the thermal adhesion layer (described later) provided in each of the first laminate 50 and the second laminate 60.

If the male member 331 and female member 332 are composed of a resin material that is the same type as the thermal adhesion layer, the bonding (thermal welding) between the thermal adhesion layer and the male member 331, the female member 332 can be carried out with ease.

Figure 5:
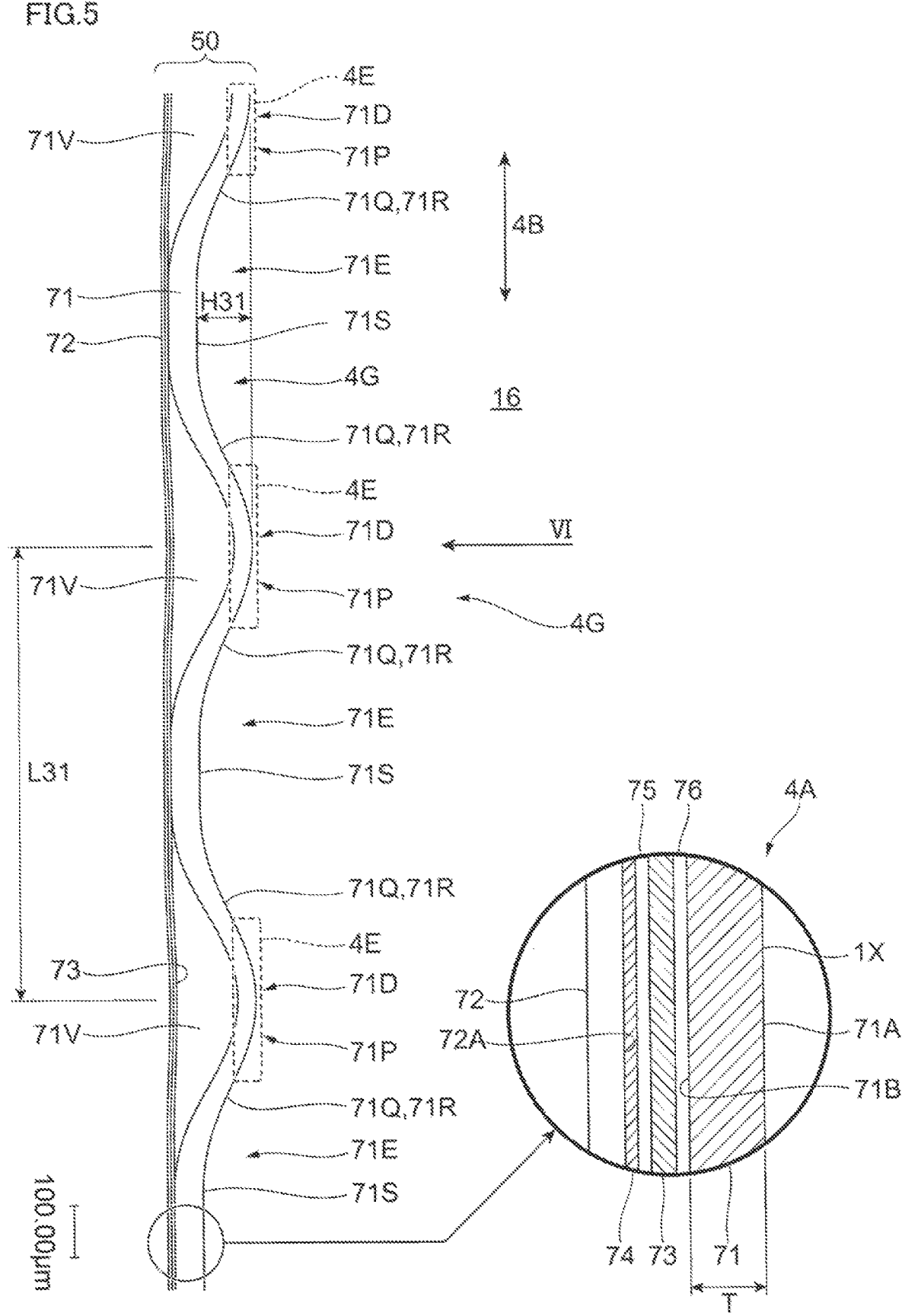
FIG. 5 is an enlarged view of a portion indicated by a reference sign V in FIG. 3.

FIG. 5 is an enlarged view of a portion indicated by the reference sign V in FIG. 3.

Note that the reference sign 4A in FIG. 5 enlarges part of the first laminate 50, but the figure shown by the reference sign 4A is a schematic diagram, and the dimensional ratio thereof is different from the actual dimensional ratio.

The first laminate 50 is provided with a thermal adhesion layer 71 facing the storage space 16 and a base material layer 72 facing the outside of the storage container 1. Furthermore, between the thermal adhesion layer 71 and the base material layer 72, an intermediate layer 73 is provided.

In the exemplary embodiment, the first laminate 50 and the second laminate 60 are made to face each other, and then heat and pressure are applied to the portions corresponding to the above-described bottom seal part 21, the first seal part 23, the second seal part 24, and the top seal part 24 to carry out the thermal welding.

In this case, the thermal adhesion layer 71 of the first laminate 50 and the thermal adhesion layer 71 (not shown) of the second laminate 60 are bonded to each other by the thermal welding.

This fixes the thermal adhesion layer 71 of the first laminate 50 and the thermal adhesion layer 71 of the second laminate 60 to each other by the thermal welding at the portions of the bottom seal part 21, the first seal part 23, the second seal part 24, and the top seal part 22.

The laminate (the first laminate 50 and the second laminate 60) forming the storage container 1 of the exemplary embodiment is configured with the base material layer 72, the intermediate layer 73, and the thermal adhesion layer 71.

The base material layer 72 is formed by a stretched film composed of, for example, polyester such as polyethylene terephthalate, and plastic such as polyamide and polypropylene. In addition, the thickness of the base material layer 72 is preferably from 5 μm to 50 μm, for example.

Note that, as the base material layer 72, a vapor deposition film may be used in which a vapor deposition layer is formed on one of the surfaces of the stretched film made of plastic by depositing metal such as aluminum, or metal oxide such as silica or alumina. Use of the vapor deposition film for the base material layer reduces the gas permeability, and thereby effectively prevents moisture absorption of the soft capsule 2.

In addition, in the exemplary embodiment, a stretched film with high linear tear properties in the MD (Machine Direction) is used for the base material layer 72.

Specifically, in the exemplary embodiment, the width direction of the storage container 1 and the MD of the base material layer 72 coincide, as shown in FIG. 1.

More specifically, in the exemplary embodiment, the MD of the base material layer 72 is along the straight line LA connecting the two cuts 31, as shown in FIG. 1.

This makes it easier to tear the base material layer 72 when opening the storage container 1 from one of the cuts 31 as a start point, as compared to the case in which the MD is not along the width direction of the storage container 1. In this case, it becomes easier to open the storage container 1.

The intermediate layer 73 (refer to FIG. 5) is configured with, for example, a stretched film made of metal foil or plastic.

In the exemplary embodiment, as the intermediate layer 73, the metal foil made of aluminum, magnesium, or copper, etc., is provided. Setting the metal foil as the intermediate layer 73 can prevent gases such as oxygen and water vapor from permeating through the first laminate 50.

In addition, as the intermediate layer 73 of the exemplary embodiment, a stretched film made of plastic such as polyester, polyamide or polypropylene may be provided. In this case, the piercing strength, the drop impact strength, etc., are improved.

Note that, as the intermediate layer 73, a vapor deposition film may be used in which a vapor deposition layer is formed on one of the surfaces of the stretched film made of plastic by depositing metal such as aluminum, silica, or metal oxide such as alumina.

Provision of the metal foil and/or the vapor deposition film for the intermediate layer reduces the gas permeability, and thereby effectively prevents moisture absorption of the soft capsule 2.

The thickness of the intermediate layer 73 is preferably in the range from 5 μm to 50 μm.

In addition, the intermediate layer 73 is not limited to one layer, but may have two or more layers as necessary.

In the case of the intermediate layer 73 with two or more layers, for example, the stretched film and the metal foil, or the stretched film and a metal vapor deposition film are provided. In this case, the intermediate layer 73 has both toughness and gas barrier properties.

Note that the intermediate layer 73 is not essential, and may be omitted.

Furthermore, in the exemplary embodiment, a print layer (ink layer) 74 is provided on one surface 72A side (inner surface side) of the base material layer 72. More specifically, the print layer 74 is provided between the base material layer 72 and the intermediate layer 73. Note that the printing layer 74 is not essential, but is provided as needed.

In the exemplary embodiment, the printing processing is performed on one surface 72A of the base material layer 72 to form the print layer 74 on the one surface 72A. Furthermore, in the exemplary embodiment, the base material layer 72 is transparent, and the print layer 74 can be seen from the outside of the storage container 1 through the base material layer 72.

Moreover, in the exemplary embodiment, as a layer for bonding the base material layer 72 and the intermediate layer 73, and the intermediate layer 73 and the thermal adhesion layer 71, a bonding layer is provided between these layers.

In the exemplary embodiment, between the print layer 74 of the base material layer 742 and the intermediate layer 73, a first bonding layer 75 that bonds the base material layer 72 and the intermediate layer 73 is provided.

More specifically, in the case where the intermediate layer 73 is configured with a stretched film or metal foil, the first bonding layer 75 is provided between the print layer 74 of the base material layer 72 and the intermediate layer 73.

In addition, in the exemplary embodiment, a second bonding layer 76 is provided between the other surface 71B of the thermal adhesion layer 71 and the intermediate layer 73, and thereby the intermediate layer 73 and the thermal adhesion layer 71 are bonded.

Each of the first laminate 50 and the second laminate 60 is laminated by publicly known manufacturing methods, for example, the dry lamination method, the extrusion lamination method, etc. The dry lamination method is a lamination method that laminates plural films via an adhesive agent, and the extrusion lamination method is a lamination method that laminates plural films via a molten thermoplastic resin.

Note that one of the first bonding layer 75 and the second bonding layer 76 may be formed by the extrusion lamination method, and the other may be formed by the dry lamination method. In other words, to form the first bonding layer 75 and the second bonding layer 76, different manufacturing methods may be combined to form the laminates.

Next, the thermal adhesion layer 71 will be described.

In the exemplary embodiment, one surface 71A of the thermal adhesion layer 71 faces the storage space 16, and part of the one surface 71A contacts the soft capsule 2. In other words, in the exemplary embodiment, the one surface 71A of the thermal adhesion layer 71 serves as an inner surface 1X of the storage container 1, and part of the inner surface 1X faces the storage space 16 and contacts the soft capsule 2 in the storage space 16.

As indicated by the reference sign 4G in FIG. 5, the thermal adhesion layer 71 is provided with concavity and convexity, and the thermal adhesion layer 71 includes plural convex parts 71D protruding toward the storage space 16.

More specifically, the thermal adhesion layer 71 is configured with an embossed film having concavity and convexity on at least a surface in contact with contents, and the thermal adhesion layer 71 includes plural convex parts 71D that protrude toward the storage space 16 and plural concave parts 71E that are depressed toward the opposite side of the storage space.

Consequently, in the exemplary embodiment, the inner surface 1X of the storage container 1 is provided with the convex parts 71D that protrude toward the storage space 16 and the plural concave parts 71E that are depressed toward the opposite side of the storage space.

The plural convex parts 71D are provided and arranged at predetermined intervals in the direction indicated by the arrow 4B in the figure.

In addition, each of the plural concave parts 71E is provided between the convex parts 71D adjacent to each other, and the concave parts 71E are arranged at predetermined intervals in the direction indicated by the arrow 4B in the figure.

The thermal adhesion layer 71 is formed by polyolefin, such as low-density polyethylene (LDPE), medium-density polyethylene (MDPE), high-density polyethylene (HDPE), and linear low-density polyethylene (LLPDE), and polypropylene (PP) having heat-sealing properties.

In addition, the density of the resin material used to form the thermal adhesion layer 71 is preferably from 0.9 g/cm$^3$ to 0.965 g/cm$^3$.

The thickness T of the thermal adhesion layer 71 is preferably in the range from 25 μm to 250 μm, for example. Note that the thickness T refers to the thickness of the material itself of the thermal adhesion layer 71, and does not refer to the difference in height between the top part 71P of the convex part 71D and the bottom part 71S of the concave part 71E.

In addition, the thermal adhesion layer 71 may be configured with a single-layer film or a multi-layer co-extrusion film.

Moreover, it is not essential to provide concavity and convexity to the entire region of the thermal adhesion layer 71, and the concavity and convexity may be provided to part of the thermal adhesion layer 71. Specifically, for example, the concavity and convexity may be provided only to the portions of the thermal adhesion layer 71 facing the storage space 16.

The wetting tension of the one surface 71A of the thermal adhesion layer 71 is preferably not more than 36 dyn/cm. If the wetting tension of the one surface 71A is not more than 36 dyn/cm, close adhesion between the soft capsule 2 and the one surface 71A can be effectively prevented.

In contrast, in the case where the wetting tension of the one surface 71A exceeds 36 dyn/cm, it becomes difficult to take the soft capsules 2 out of the storage container 1 in some cases because of increased close adhesion between the soft capsule 2 and the one surface 71A. Note that the wetting tension can be measured, for example, using the method specified in JIS K 6768:1999.

FIG. 6A is a diagram viewing the one surface 71A of the thermal adhesion layer 71 from a front side, which also views the thermal adhesion layer 71 from the direction indicated by the arrow VI in FIG. 5.

In other words, FIG. 6A is a diagram viewing the one surface 71A from the position facing the one surface 71A of the thermal adhesion layer 71.

In the exemplary embodiment, each of the convex parts 71D is formed into a rectangular shape when the one surface 71A of the thermal adhesion layer 71 is viewed from the front. Furthermore, in the exemplary embodiment, the length TL1 of one diagonal line TS1 of the convex part 71D is longer than the length TL2 of the other diagonal line TS2. In other words, the shape of each convex part 71D is a rhombus.

To describe the size of the convex part 71D, in each of the convex parts 71D, the average value of the diagonal line is preferably within the range from 200 µm to 1000 µm, more preferably within the range from 400 µm to 800 µm, and still more preferably within the range from 500 µm to 650 µm.

That is, (the length TL1 of the diagonal line TS1+the length TL2 of the diagonal line TS2)/2 is preferably within the range from 200 µm to 1000 µm, more preferably within the range from 400 µm to 800 µm, and still more preferably within the range from 500 µm to 650 µm.

The distance L31 between the top parts 71P of the convex parts 71D (refer to FIG. 5) is preferably 300 µm to 4000 µm (0.3 mm to 4.0 mm), and more preferably 500 µm to 2000 µm (0.5 mm to 2.0 mm). Setting the distance L31 between the top parts 71P of the convex parts 71D in the range prevents the surface of the soft capsule 2 from contacting the concave part 71E, to thereby effectively prevent close adhesion between the soft capsule 2 and the one surface 71A.

In addition, the height H31 of the convex part 71D (refer to FIG. 5) is preferably 20 µm to 500 µm, and more preferably 50 µm to 300 µm. Here, the height H31 refers to the difference between the uppermost part and the lowermost part of the one surface 71A. Setting the height H31 of the convex part 71D in the range prevents the surface of the soft capsule 2 from contacting the concave part 71E, to thereby effectively prevent close adhesion between the soft capsule 2 and the one surface 71A.

Furthermore, as shown in FIG. 6A, the plural convex parts 71D are provided in the exemplary embodiment. More specifically, the one surface 71A is provided with a convex row 71G (hereinafter, referred to as "first convex row 71G"), in which the plural convex parts 71D are arranged in one direction.

In addition, in the exemplary embodiment, plural first convex rows 71G are arranged in an intersecting direction that intersects the one direction.

In each of the first convex rows 71G, the convex parts 71D are arranged along the direction in which one side 71K among the four sides of the convex part 71D extends.

In addition, in the exemplary embodiment, the convex parts 71D are arranged in the above-described intersecting direction, and thereby a convex row 71H along the intersecting direction (hereinafter, referred to as "second convex row 71H") is provided.

There are plural second convex rows 71H arranged in one direction. In addition, in each of the second convex rows 71H, the convex parts 71D are arranged along the direction in which one of other sides 71J among the four sides of the convex part 71D extends.

Moreover, in the exemplary embodiment, between the first convex row 71G along the one direction and the first convex row 71G adjacent thereto, a first groove 71M along the one direction is provided.

Between the second convex row 71H along the intersecting direction and the second convex row 71H adjacent thereto, a second groove 71N along the intersecting direction is provided.

Here, the width W6 of the first groove 71M and the second groove 71N is preferably within the range from 100 µm to 300 µm, and more preferably within the range from 150 µm to 200 µm.

Figure 7:
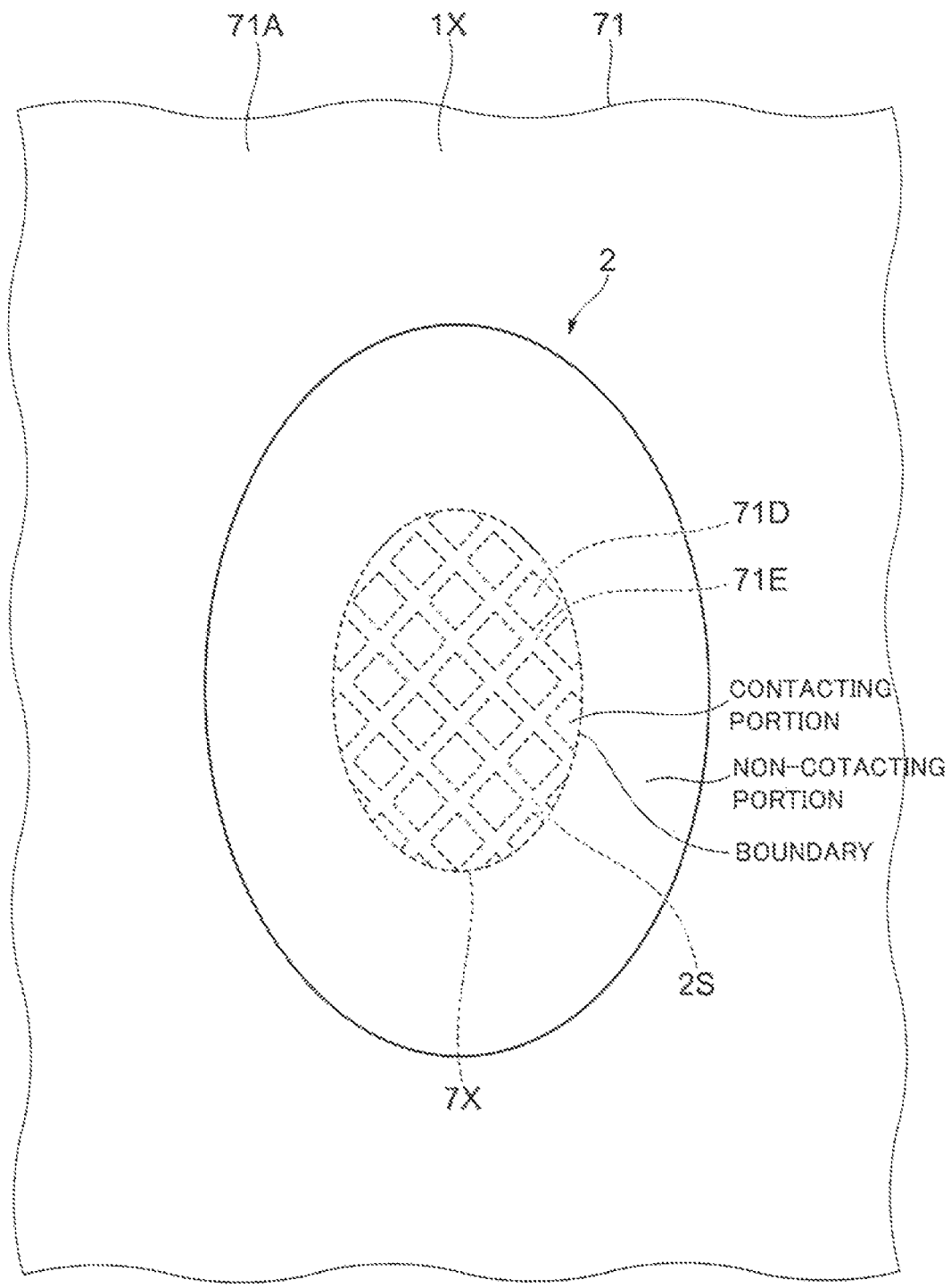
FIG. 7 is a diagram in the case where the storage container is viewed from the direction indicated by the arrow VII in FIG. 3.

FIG. 7 is a diagram in the case where the storage container 1 is viewed from the direction indicated by the arrow VII in FIG. 3. Note that, in FIG. 7, one soft capsule 2 is also shown.

In the exemplary embodiment, each of the soft capsules 2 includes a contact region 2S to be in contact with the one surface 71A of the thermal adhesion layer 71. The contact region 2S is elliptic and faces the one face 71A (inner surface 1X) and contacts the one surface 71A.

The "contact region 2S" refers to the area located inside an annular line 7X obtained by connecting the boundaries between the portion of the soft capsule 2 that contacts the one surface 71A and the portion that does not contact the one surface 71A.

In the exemplary embodiment, the plural convex parts 71D and concave parts 71E provided on the thermal adhesion layer 71 face the contact region 2S. In other words, in the exemplary embodiment, the plural convex parts 71D contact the contact region 2S, and the concave parts 71E face the contact region 2S.

Note that, in FIG. 7, of the convex parts 71D and the concave parts 71E provided on the thermal adhesion layer 71, only the convex parts 71D and the concave parts 71E located at the portion facing the contact region 2S are shown.

In the exemplary embodiment, the convex parts 71D contact the contact region 2S. In addition, part of the contact region 2S is separated from the one surface 71A. Specifically, in the exemplary embodiment, the concave part 71E is provided next to the convex part 71D, and portions of the contact region 2S facing the concave parts 71E are separated from one surface 71A.

In the exemplary embodiment, the convex part 71D and the concave part 71E function as a separation unit that separates part of the contact region 2S from the one surface 71A. In the exemplary embodiment, provision of the separation unit prevents the soft capsule 2 from contacting the bottom part 71S.

Here, the "separation unit" has a function of separating part of the contact region 2S from the one surface 71A. In the exemplary embodiment, the convex part 71D is used to separate part of the contact region 2S from the one surface 71A; however, for example, part of the contact region 2S may be separated from the one surface 71A by providing only the concave part 71E without providing the convex part 71D.

When the soft capsule 2 absorbs moisture, the surface of the soft capsule 2 has adhesion properties and easily adheres to the one surface 71A, and thereby, it becomes difficult to take the soft capsules 2 out of the storage container 1.

In contrast, in the exemplary embodiment, as described above, as a result of providing the convex parts 71D and the concave parts 71E, the contact area between the one surface 71A and the soft capsules 2 is reduced; accordingly, the resistance acting on the soft capsules 2 is also reduced and the soft capsules 2 move with ease. Consequently, even if the soft capsule 2 absorbs moisture, it becomes easier to take the soft capsule 2 out of the storage container 1.

More specifically, the surface of the soft capsule 2 softens under high temperature and high humidity, and easily becomes adhesive.

In the case where the storage container 1 is unopened and there is a moisture absorbent such as silica gel inside the storage container 1, it is difficult for the soft capsule 2 to absorb moisture. However, after opening the storage container 1, the soft capsule 2 sometimes absorbs moisture even though the moisture absorbent is in the storage container 1. In such a case, the soft capsule 2 adheres to the one surface 71A, and thereby, it becomes difficult to take the soft capsules 2 out of the storage container 1.

In contrast, with the configuration of the exemplary embodiment, the adhesion acting between the one surface 71A and the soft capsule 2 is reduced, and it becomes easier to take out the soft capsule 2.

In the exemplary embodiment, of the one surface 71A of the thermal adhesion layer 71, the portion indicated by the reference sign 4E in FIG. 5 is brought into contact with the contact region 2S of the soft capsule 2. Specifically, in the exemplary embodiment, the contact region 2S contacts the top part 71P of the convex part 71D.

Furthermore, in the exemplary embodiment, the sum of the areas of the top parts 71P (the sum of the respective areas of the plural top parts 71P that the contact region 2S contacts) is smaller than the area of the portions of the contact region 2S that separate from the one surface 71A.

In other words, in the exemplary embodiment, the area of the portion of the contact region 2S of the soft capsule 2 that contacts the one surface 71A is smaller than the area of the portion of the contact region 2S that is separated from the one surface 71A.

In this case, as compared to the case where the area of the contact portion is larger than the area of the separation portion, the drag acting on the soft capsule 2 is even smaller, and thereby it becomes easier for the soft capsule 2 to move further.

Furthermore, in the exemplary embodiment, each of the convex parts 71D is formed into a quadrangular pyramid with four ridge lines 71Q extending radially from the top part 71P. In addition, FIG. 6B shows the case in which the convex part 71D is viewed from the lateral side, and the top part 71P of the convex part 71D is formed to have curvature and draw a gentle arc.

The cross section shown in FIG. 5 is the cross section along the V-V line in FIG. 6A, and as shown in FIG. 5, each of the convex parts 71D has ridge lines 71Q extending from the top part 71P toward the base material layer 72, and is formed into a quadrangular pyramid.

In other words, each of the convex parts 71D has side parts 71R that extend toward the base material layer 72 and is inclined to the base material layer 72. To put it another way, the side part 71R of each of the convex parts 71D has inclination.

Figure 8:
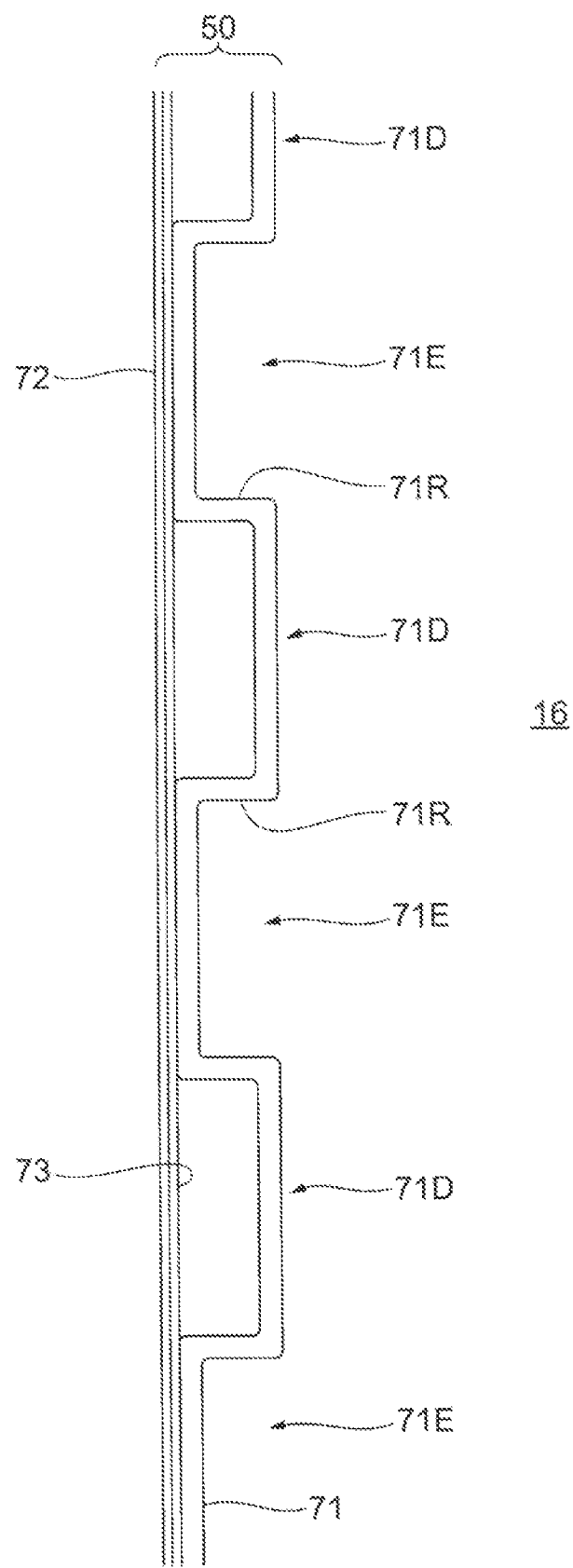
FIG. 8 is a diagram showing another configuration example of a convex part.

In the case where the convex part 71D is formed into the quadrangular pyramid as described above, the contact area between the soft capsule 2 and the convex part 71D becomes even smaller as compared to the case where the side part 71R of the convex part 71D is not inclined like the other configuration example of the convex part 71D shown in FIG. 8, and thereby it becomes easier for the soft capsule 2 to move further.

Note that, in the exemplary embodiment, the description has been given of the case where the convex part 71D is formed into the quadrangular pyramid as an example; however, the shape of the convex part 71D is not limited thereto, and the shape may be other polygonal pyramids such as a triangular pyramid and a pentagonal pyramid, or a cone, and alternatively, the shape may be truncated polygonal pyramids in which the top part 71P of the convex part 71D is substantially a plane, such as a truncated quadrangular pyramid, a truncated triangular pyramid, and a truncated pentagonal pyramid, or a truncated cone.

Furthermore, in the exemplary embodiment, as shown in FIG. 5, at the place where the convex part 71D is formed, a void 71V is formed on the opposite side of the storage space 16 across the one surface 71A (inner surface 1X).

Specifically, in the exemplary embodiment, the intermediate layer 73, which is another layer different from the thermal adhesion layer 71, is provided; between the thermal adhesion layer 71 corresponding to the place where the convex part 71D has been formed and the intermediate layer 73, the void 71V, which is partitioned by the other surface 71B and the intermediate layer 73, is formed.

In the exemplary embodiment, the void 71V protects the soft capsules 2 from the impact acting on the soft capsules 2.

In addition, since the void 71V functions as a heat-insulating layer, the temperature in the storage space 16 is kept constant. For example, even in the case where the storage container 1 is placed under the high temperature condition, the void 71V effectively prevents the soft capsule 2 from softening affected by temperature change in the outside air; therefore, the one surface 71A and the soft capsule 2 do not closely adhere to each other, and it does not become difficult for the soft capsule 2 to be taken out.

For these reasons, it is preferable that the void 71V is formed.

From the viewpoint of forming the void 71V, it is more preferable to form each of the first laminate 50 and the second laminate 60 by the dry lamination method. If each of the first laminate 50 and the second laminate 60 are formed by the extrusion lamination method, the void 71V can be formed, but the comparison of the first laminate 50 and the second laminate 60 formed by the extrusion lamination method with the first laminate 50 and the second laminate 60 formed by the dry lamination method results in a conclusion that the first laminate 50 and the second laminate 60 formed by the dry lamination method are preferred. In addition, it is preferable that at least the bonding layer adjacent to the thermal adhesion layer be formed by lamination by the dry lamination method.

Regardless of the presence or absence of the print layer and the intermediate layer, the effect of the void 71V can be obtained if at least the bonding layer adjacent to the thermal adhesion layer is formed by the dry lamination method.

In other words, in the exemplary embodiment, it is preferable that at least the second bonding layer 76 of each of the first laminate 50 and the second laminate 60 be formed by lamination by the dry lamination method.

Note that the first bonding layer 75 may be laminated using any publicly known lamination method such as the dry lamination method or the extrusion lamination method; however, in the case where the second bonding layer 76 is laminated by the dry lamination method, it is preferable to laminate the first bonding layer 75 by the dry lamination method as well, from the viewpoint of manufacturing efficiency.

Note that, in the case where the first bonding layer 75 and the second bonding layer 76 are laminated by the dry lamination method, it is preferable to use a larger amount of adhesive agent for forming the second bonding layer 76 than the amount of adhesive agent for forming the first bonding layer 75.

In the exemplary embodiment, the concavity and convexity provided to the thermal adhesion layer 71 reduces the bonding area between the thermal adhesion layer 71 and the intermediate layer 73, and therefore, the bonding strength between the thermal adhesion layer 71 and the intermediate layer 73 tends to decrease.

In this case, if the thickness of the second bonding layer 76 (the amount of adhesive agent applied to the portion of the second bonding layer 76) is made larger than the thickness of the first bonding layer 75 (the amount of adhesive agent applied to the portion of the first bonding layer 75) as in the exemplary embodiment, it becomes easy to secure the bonding strength between the thermal adhesion layer 71 and the intermediate layer 73.

Note that the preferred range of the amount of adhesive agent applied for the first bonding layer 75 is 2.0 g/m 2 to 3.5 g/m$^2$, and the preferred range of the amount of adhesive agent applied for the second bonding layer 76 is 3.0 g/m 2 to 6.0 g/m$^2$.

Note that, in the exemplary embodiment, the description has been given of the case in which the shape of the frontal vision of the convex part 71D is a rhombus as an example, but the rhombus is merely an example, and the thermal adhesion layer 71 may be provided with the convex parts 71D having other shapes.

Specifically, for example, the shape of the frontal vision of each of the convex parts 71D may be a square. In addition, the shape of the frontal vision of each of the convex parts 71D may be a polygon other than a rectangle, or a circle.

Moreover, a linear convex part 71D may be provided, and a concave part 71E may be provided in a region enclosed by the linear convex part 71D.

In addition, to provide the linear convex part 71D, the width of the convex part 71D may be reduced, and the convex part 71D may be provided with a higher density.

Example

The configuration of a laminate 50X (the same laminate as the first laminate 50 and the second laminate 60 shown in FIGS. 5 and 6, etc.) is as follows.
(1) Configuration of the laminate 50X: the base material layer 72; the print layer 74; the first bonding layer 75; the intermediate layer 73; the second bonding layer 76; the thermal adhesion layer 71
(2) Details of each layer
The base material layer 72: a polyethylene terephthalate film (thickness: 12 μm)
The print layer 74: printing ink for gravure printing
The first bonding layer 75: a two-part curing urethane adhesive agent for dry lamination
The intermediate layer 73: aluminum foil (thickness: 7 μm)
The second bonding layer 76: a two-part curing urethane adhesive agent for dry lamination
The thermal adhesion layer 71: an embossed film made of linear low-density polyethylene (LLDPE) (thickness T: 70 μm, the shape of the convex part 71D and the concave part 71E: the shape shown in FIG. 5)
(3) Manufacturing method
The gravure printing was performed on one surface 72A of the base material layer 72 to form the print layer 74.

Next, an adhesive agent was applied on the print layer 74, and the base material layer 72 having the print layer 74 and the intermediate layer 73 (aluminum foil) were bonded by the dry lamination method.

Subsequently, an adhesive agent was applied to the surface of the intermediate layer 73 facing the thermal adhesion layer 71, and the thermal adhesion layer 71 was bonded by the dry lamination method to obtain the laminate 50X.

Comparative Example

In the comparative example, as the thermal adhesion layer 71, linear low-density polyethylene without concavity and convexity (thickness T: 60 μm) was used.

The laminate was prepared in the same way as the configuration in the example, except for the use of the linear low-density polyethylene without concavity and convexity.
[Experimental results] The laminate 50X and the laminate of the comparative example were prepared, the soft capsules 2 were placed on these laminates, and experiments for investigating rolling of the soft capsules 2 were conducted. Note that, as the soft capsule, commercially available "Traditional Garlic & Egg Yolk" made by Kenkou Kazoku Co., Ltd. was used.

Specifically, a 100 mm (horizontal)×200 mm (vertical) laminate was prepared, and the four corners of the laminate were fixed to an A4-size stainless steel plate using adhesive tape.

After soaking the soft capsule 2 in tap water of room temperature for one minute, the surface of the soft capsule 2 was wiped off dry.

Figure 9:
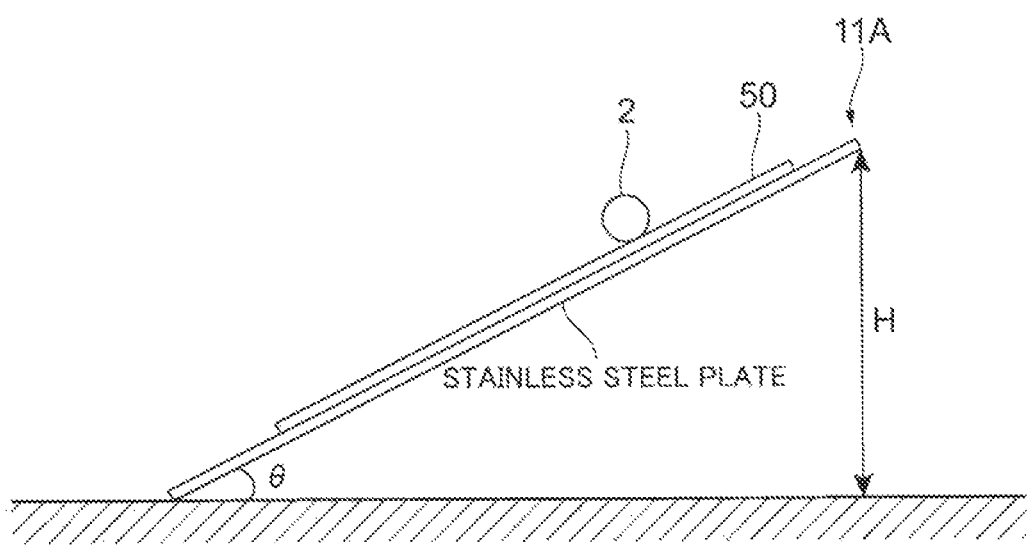
FIG. 9 is a diagram illustrating procedures of the experiment.

Subsequently, the soft capsule 2 was placed on the laminate fixed to the stainless steel plate. Then, as shown in FIG. 9 (the figure illustrating experimental procedures), one end portion 11A side of the stainless steel plate was lifted up and the angle θ of the stainless steel plate when the soft capsule 2 started rolling was measured.

FIG. 10 is a table showing the experimental results.

The experiment was conducted three times for each of the example and the comparative example. In the example, the average value (the average value of the angle θ) of the three experiments was 16°, whereas in the comparative example, the result was 45°.

That is, in the example, since the contact area between the soft capsule 2 and the thermal adhesion layer 71 was relatively small, the adhesion acting between the soft capsule 2 and the thermal adhesion layer 71 was small, and thereby the soft capsule 2 started rolling when the angle θ of the stainless steel plate was small.

In contrast thereto, in the comparative example, since the contact area between the soft capsule 2 and the thermal adhesion layer 71 was relatively large, the adhesion acting between the soft capsule 2 and the thermal adhesion layer 71 was large, and thereby the soft capsule 2 did not start rolling until the angle θ of the stainless steel plate became large.

REFERENCE SIGNS LIST

1 Storage container
1X Inner surface
2 Soft capsule
2S Contact region
16 Storage space
71 Thermal adhesion layer
71D Convex part
71E Concave part
71G First convex row
71H Second convex row
71M First groove
71N Second groove
71P Top part 71V Void
72 Base material layer
73 Intermediate layer
TS1 One diagonal line
TS2 The other diagonal line

The invention claimed is:

1. A storage container for soft capsules to be orally ingested, the storage container comprising:
   a storage space storing the soft capsules;
   an inner surface facing the storage space and contacting the soft capsules inside the storage space; and
   a separation unit separating a part of a contact region of each of the soft capsules from the inner surface, the contact region contacting the inner surface,
   wherein
   the inner surface is provided with a convex part protruding toward the storage space and a concave part depressed toward an opposite side of the storage space,
   the separation unit separates the part of the contact region from the inner surface using the convex part, and
   a plurality of the convex parts is provided to contact the contact region.

2. The storage container for soft capsules according to claim 1, wherein an area of a contact portion of the contact region contacting the inner surface is smaller than an area of a separation portion of the contact region separated from the inner surface.

3. The storage container for soft capsules according to claim 1, wherein, when the inner surface is viewed from a front side, the convex part is formed in a rectangular shape.

4. The storage container for soft capsules according to claim 3, wherein one of diagonal lines of the convex part is longer than the other.

5. The storage container for soft capsules according to claim 4, wherein, on the inner surface, a plurality of convex rows, each of which includes the plurality of convex parts arranged in one direction, are arranged in an intersecting direction that intersects the one direction.

6. The storage container for soft capsules according to claim 5, wherein
   the convex parts are arranged in the intersecting direction, and the plurality of convex rows along the intersecting direction are arranged in the one direction, and,
   between the convex rows along the one direction, a groove along the one direction is provided, and, between the convex rows along the intersecting direction, a groove along the intersecting direction is provided.

7. The storage container for soft capsules according to claim 1, wherein one of diagonal lines of the convex part is longer than the other.

8. The storage container for soft capsules according to claim 7, wherein, on the inner surface, a plurality of convex rows, each of which includes the plurality of convex parts arranged in one direction, are arranged in an intersecting direction that intersects the one direction.

9. The storage container for soft capsules according to claim 8, wherein
   the convex parts are arranged in the intersecting direction, and the plurality of convex rows along the intersecting direction are arranged in the one direction, and,
   between the convex rows along the one direction, a groove along the one direction is provided, and, between the convex rows along the intersecting direction, a groove along the intersecting direction is provided.

10. The storage container for soft capsules according to claim 3, wherein, on the inner surface, a plurality of convex rows, each of which includes the plurality of convex parts arranged in one direction, are arranged in an intersecting direction that intersects the one direction.

11. The storage container for soft capsules according to claim 10, wherein
    the convex parts are arranged in the intersecting direction, and the plurality of convex rows along the intersecting direction are arranged in the one direction, and,
    between the convex rows along the one direction, a groove along the one direction is provided, and, between the convex rows along the intersecting direction, a groove along the intersecting direction is provided.

12. The storage container for soft capsules according to claim 1, wherein, on the inner surface, a plurality of convex rows, each of which includes the plurality of convex parts arranged in one direction, are arranged in an intersecting direction that intersects the one direction.

13. The storage container for soft capsules according to claim 12, wherein
    the convex parts are arranged in the intersecting direction, and the plurality of convex rows along the intersecting direction are arranged in the one direction, and,
    between the convex rows along the one direction, a groove along the one direction is provided, and, between the convex rows along the intersecting direction, a groove along the intersecting direction is provided.

14. The storage container for soft capsules according to claim 1, wherein
    another layer different from a layer having a portion serving as the inner surface is provided on an opposite side of the storage space across the inner surface, and
    a void is provided between the convex parts and the another layer.

15. A soft capsule-containing storage container comprising:
    the storage container for soft capsules according to claim 1 that has contained the soft capsules.

16. The storage container for soft capsules according to claim 1, further comprising a laminate comprising:
    a contact surface contacting the soft capsules stored in the storage space; and
    a separation unit separating a part of a contact region of each of the soft capsules from the contact surface, the contact region contacting the contact surface.

* * * * *